United States Patent [19]
Fujiwara et al.

[11] Patent Number: 5,402,051
[45] Date of Patent: Mar. 28, 1995

[54] FLOOR CLEANING ROBOT AND METHOD OF CONTROLLING SAME

[75] Inventors: Yoshimori Fujiwara, Tokyo; Kazuhiro Hiratsuka, Moriguchi; Yoshiya Yamaue, Moriguchi; Hiroaki Arakawa, Moriguchi; Daizo Takaoka, Moriguchi; Ryuji Suzuki, Moriguchi, all of Japan

[73] Assignee: Sanyo Electric Co., Ltd., Moriguchi, Japan

[21] Appl. No.: 35,593

[22] Filed: Mar. 23, 1993

[30] Foreign Application Priority Data
Mar. 24, 1992 [JP] Japan .................. 4-065684

[51] Int. Cl.$^6$ .............................. G05D 1/00
[52] U.S. Cl. .................. 318/587; 364/424.02
[58] Field of Search .......... 312/567, 568, 568.12, 312/580, 587; 364/424.02, 424.01, 424.04, 443, 444, 445; 180/167, 168

[56] References Cited

U.S. PATENT DOCUMENTS

| | | |
|---|---|---|
| 4,500,970 | 2/1985 | Daemmer . |
| 4,926,103 | 5/1990 | Summerville et al. ............ 318/587 |
| 4,940,925 | 7/1990 | Wand et al. ........................ 318/587 |
| 5,001,635 | 3/1991 | Yasutomi . |
| 5,111,401 | 5/1992 | Everett, Jr. et al. ............ 364/424.02 |
| 5,238,739 | 2/1994 | Summerville et al. ............ 364/444 |
| 5,280,431 | 1/1994 | Summerville et al. ......... 364/424.02 |
| 5,305,217 | 4/1994 | Nakamura et al. ............. 364/424.02 |

FOREIGN PATENT DOCUMENTS

| | | |
|---|---|---|
| 0221423 | 5/1987 | European Pat. Off. . |
| 0424229 | 4/1991 | European Pat. Off. . |
| 2526181 | 4/1983 | France . |
| 3709627 | 10/1988 | Germany . |
| WO90/14788 | 12/1990 | WIPO . |

*Primary Examiner*—Jonathan Wysocki
*Attorney, Agent, or Firm*—Armstrong, Westerman, Hattori, McLeland & Naughton

[57] ABSTRACT

A robot for cleaning a floor of a railroad vehicle has a robot body equipped with a cleaning mechanism and includes a travel mechanism controllable for locomotion in a desired direction. The robot also includes a distance detecting arrangement directed at least toward the front and opposite sides of the robot body for measuring the distance to an obstacle or a wall, and a map storing arrangement which has stored therein a cleaning region of the floor previously as a two-dimensional map. The robot also includes a path storing arrangement which has stored therein a predetermined path of travel for cleaning the floor as expressed in coordinates on the map. A first control arrangement is provided for recognizing the coordinates of the position of the robot body on the map based on outputs from the distance detecting arrangement when the robot body is placed at an end portion of the floor. A second control arrangement is also provided for correcting the course of the robot body based on outputs from the distance detecting arrangement while the robot body travels from the coordinate position recognized by the first control arrangement along the predetermined path.

9 Claims, 8 Drawing Sheets

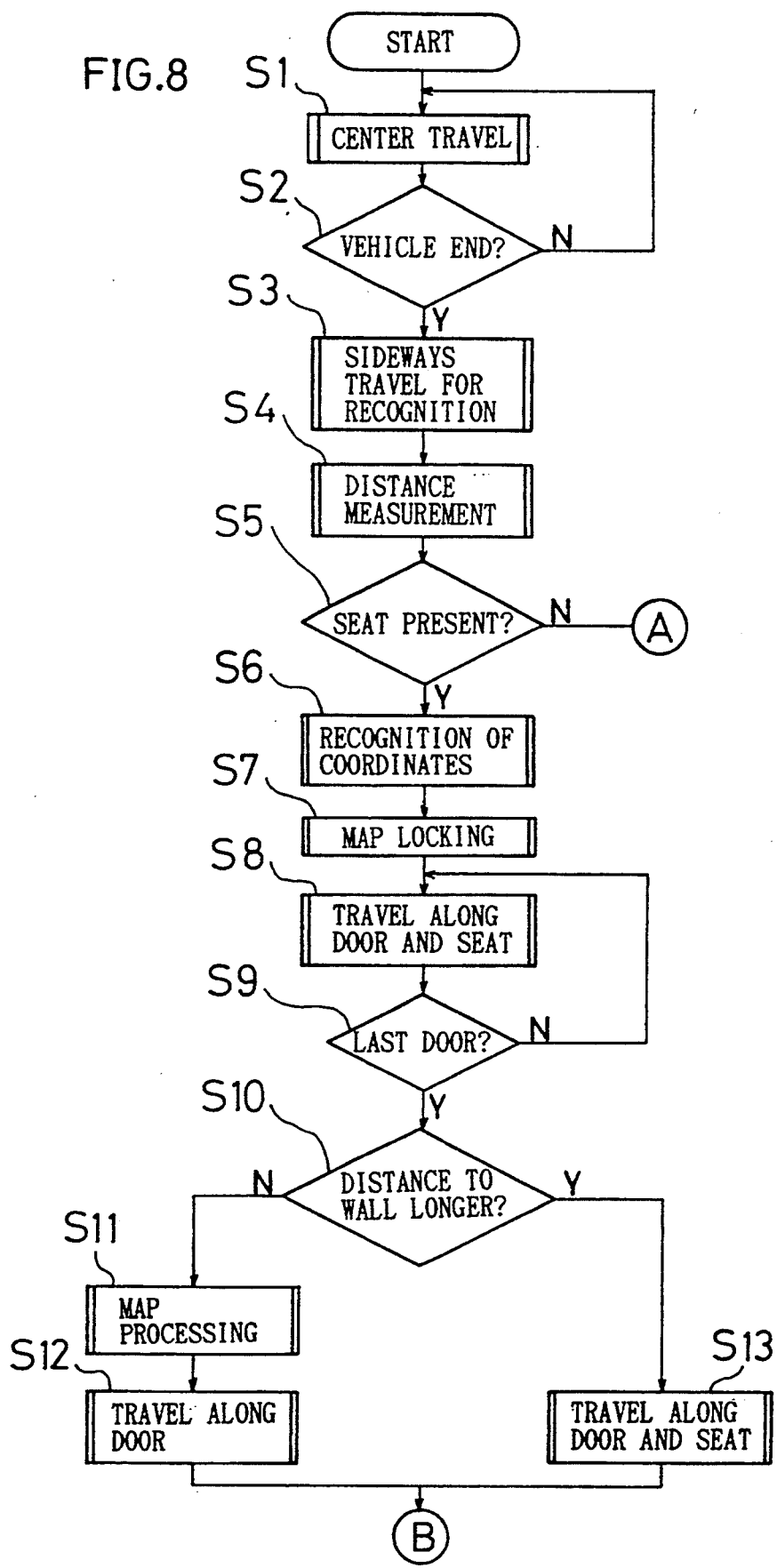

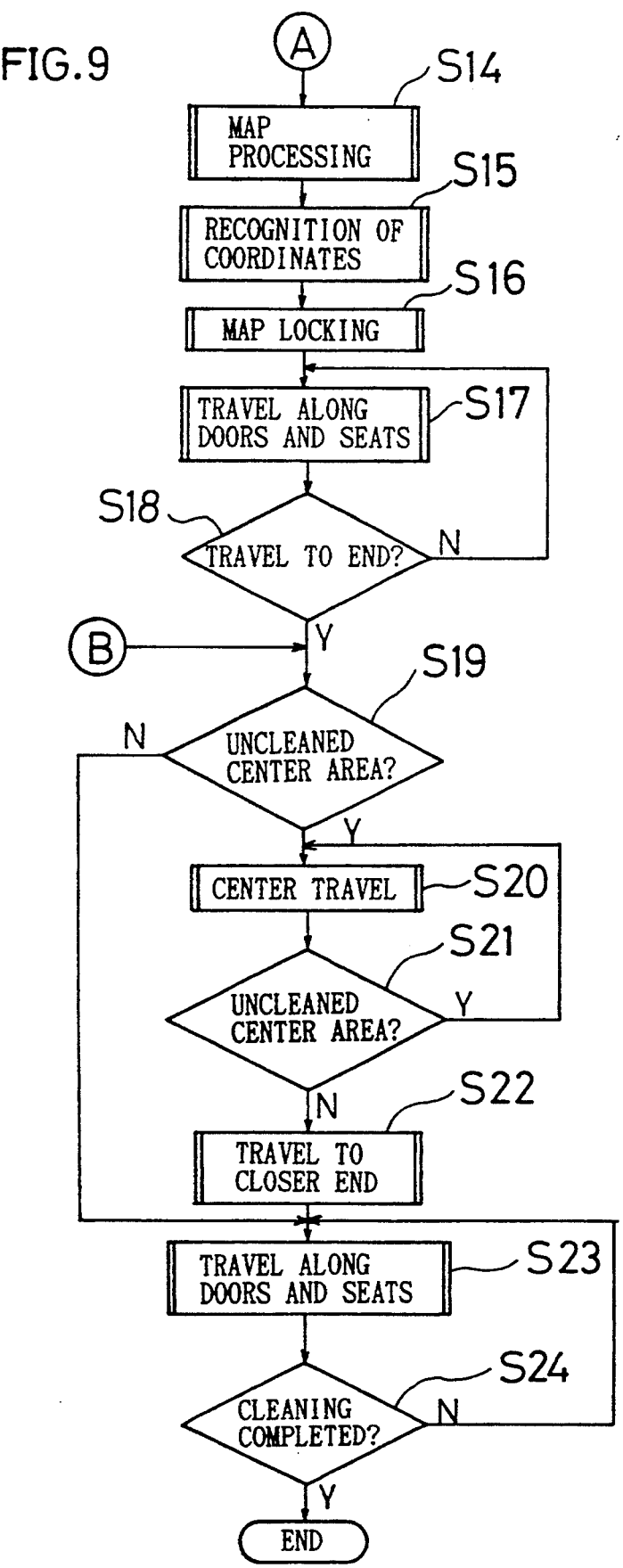

FLOOR CLEANING ROBOT AND METHOD OF CONTROLLING SAME

FIELD OF THE INVENTION

The present invention relates to a robot for automatically cleaning the floor of a room such as the inside of a rolling stock (railroad vehicles) and to a method of controlling the same.

BACKGROUND OF THE INVENTION

FIG. 10 shows the interior of railroad vehicles wherein seats 8 elongated in the direction of advance of the vehicle and entrance-exit doors 84 are arranged alternately along both side walls of the vehicle. When the floor of the vehicle is to be automatically cleaned by a robot having rotary brushes or like cleaning means, the robot must be caused to automatically travel along a predetermined course. The travel needs to cover every nook and corner while avoiding obstacles such as the seats 8.

Such railroad vehicles are generally divided into two types, i.e., motor (engine) cars (FIG. 10, (a)) having a driver's (engineer's) cab 85 at the front or rear end with respect to the direction of advance, and passenger cars (FIG. 10, (c)) having no driver's cab and having seats 8 including those positioned at the front and rear ends. The path of travel of the robot needs to be changed according to the type of vehicles to be cleaned.

For use in conventional automatic locomotion robots, a control system is already known which comprises visual sensors mounted on the body of the robot as directed outside therearound for controlling the travel of the robot while recognizing obstacles based on the outputs of the visual sensors.

When used for the floor cleaning robot, the system visually detects the presence of the seat 8 or driver's cab 85, enabling the robot to travel automatically on the floor.

However, the conventional system must monitor the outputs of the visual sensors at all times to detect presence or absence of obstacles and judge the configuration of the obstacle, if any, such that every time an obstacle has been detected, the system needs to make a decision as to the course of travel to avoid the obstacle. Accordingly, even if a microcomputer is used for making the judgment and decision, a very complex procedure needs to be executed.

Consequently, the robot must discontinue its travel for a long period of time when changing the direction of advance. The system is therefore unusable for the floor cleaning robot.

On the other hand, it appears useful to move the robot along a predetermined course of travel stored in the robot in advance. In this case, however, it becomes necessary not only to set a plurality of courses of travel for different types of vehicles and to follow an input procedure for a change-over between the courses but also to set the robot in a predetermined initial position accurately, whereas errors will invariably occur in positioning the robot, or the actual path traveled by the robot will inevitably involve a deviation from the predetermined course, for example, owing to slippage of the travel mechanism which occurs subsequently. Such errors, if accumulating, will greatly deviate the robot from the predetermined course.

SUMMARY OF THE INVENTION

An object of the present invention is to provide a floor cleaning robot which travels along a predetermined course accurately with a rapid change in the direction of advance for an efficient floor cleaning operation and a method of controlling the robot.

The present invention provides a floor cleaning robot having a robot body which is equipped with a cleaning mechanism and which comprises a travel mechanism controllable for locomotion in a desired direction, distance detecting means arranged as directed at least toward the front and opposite sides of the robot body for measuring the distance to a seat or wall, map storing means having stored therein a cleaning region of the floor of a vehicle inside thereof as a two-dimensional map, means having stored therein a predetermined path of travel for cleaning the floor as expressed in coordinates on the map, first control means for recognizing the coordinates of the position of the robot body on the map based on outputs from the distance detecting means when the robot body is placed at an end portion of the vehicle inside thereof, and second control means for correcting the course of the robot body based on outputs from the distance detecting means while the robot body travels from the coordinate position recognized by the first control means along the predetermined path.

With the method of the present invention for controlling the floor cleaning robot, the robot body as placed on the interior floor of the vehicle is first caused to travel to an end portion of the vehicle along the direction of advance of the vehicle. At the end portion of the vehicle, the coordinates of the position of the robot body on the map are recognized based on outputs from the distance detecting means. The robot thereafter cleans the floor while the course of the robot body is being corrected by the second control means based on outputs from the distance detecting means so that the robot body travels along the predetermined path.

When the floor cleaning robot is to start a floor cleaning operation, the robot is first placed on the interior floor of the vehicle approximately centrally thereof. In an automatic cleaning mode, the robot travels the center of the vehicle to an end portion thereof along the direction of advance of the vehicle and temporarily stops. At this time, outputs from the distance detecting means are taken in to detect the distance to a seat if the seat is present laterally of the robot body or the distance to the side wall of the vehicle if no seat is present. Since the robot is sufficiently close to the vehicle end portion at this time, highly accurate data is available from the distance detecting means. This enables the robot to accurately recognize the current position of its own on the map.

The robot then automatically travels along the predetermined path on the map, detects its current position at a suitable time from the outputs of the distance detecting means taken in to thereby check whether it is actually traveling along the predetermined path and corrects its course if deviating from the path.

According to the present invention, the floor cleaning robot is caused to travel to the vehicle end portion and thereby made to accurately recognize the current position on the map although the position at which the robot is initially placed on the floor may somewhat differ, and thereafter travels along the predetermined path. This eliminates the need for judgment and decision making through the complex procedure conventionally necessary to permit rapid changes in the direction of advance. Since the course of the robot is corrected from time to time suitably, the robot is unlikely to deviate greatly from the predetermined path.

BRIEF DESCRIPTION OF THE DRAWINGS

FIG. 8 is a flow chart showing the first half of a robot control operation;

FIG. 9 is a flow chart showing the second half of the robot control operation.

DETAILED DESCRIPTION OF EMBODIMENT

An embodiment of the present invention will be described below in detail with reference to the drawings.

Figure 2:
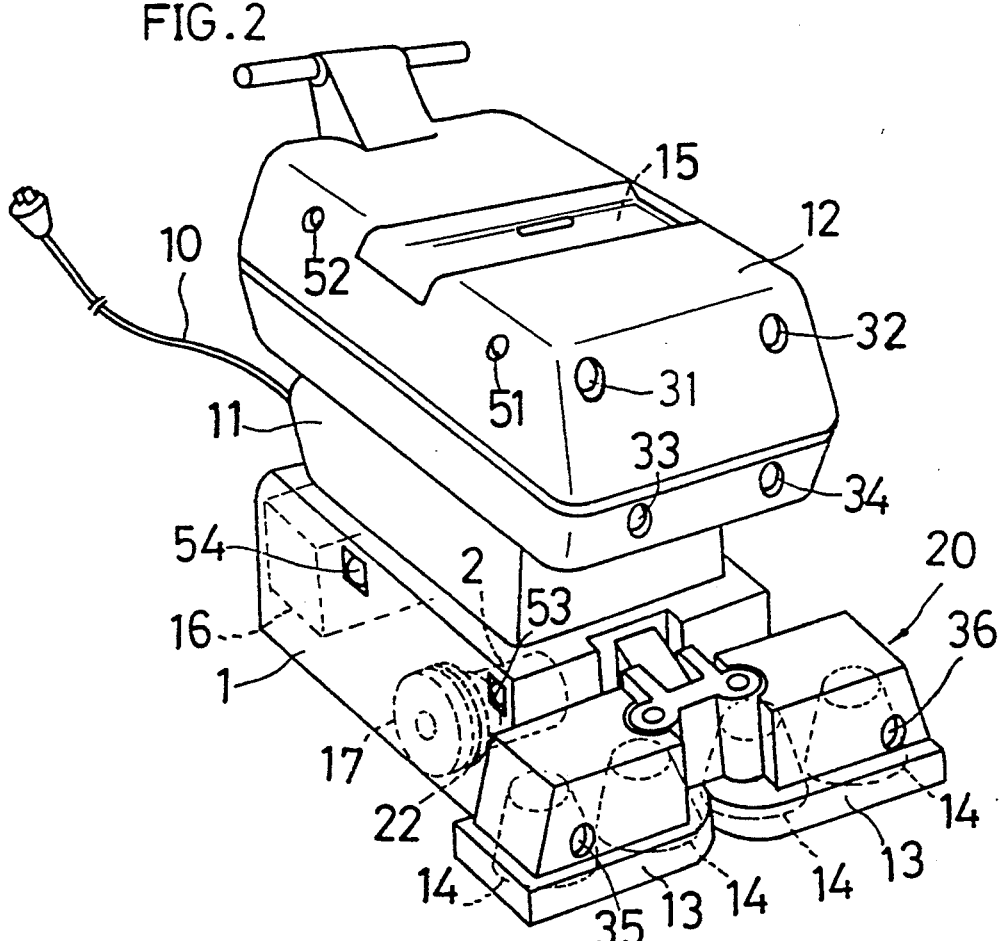
FIG. 2 is a perspective view showing the floor cleaning robot as it is seen from the front.
Figure 3:
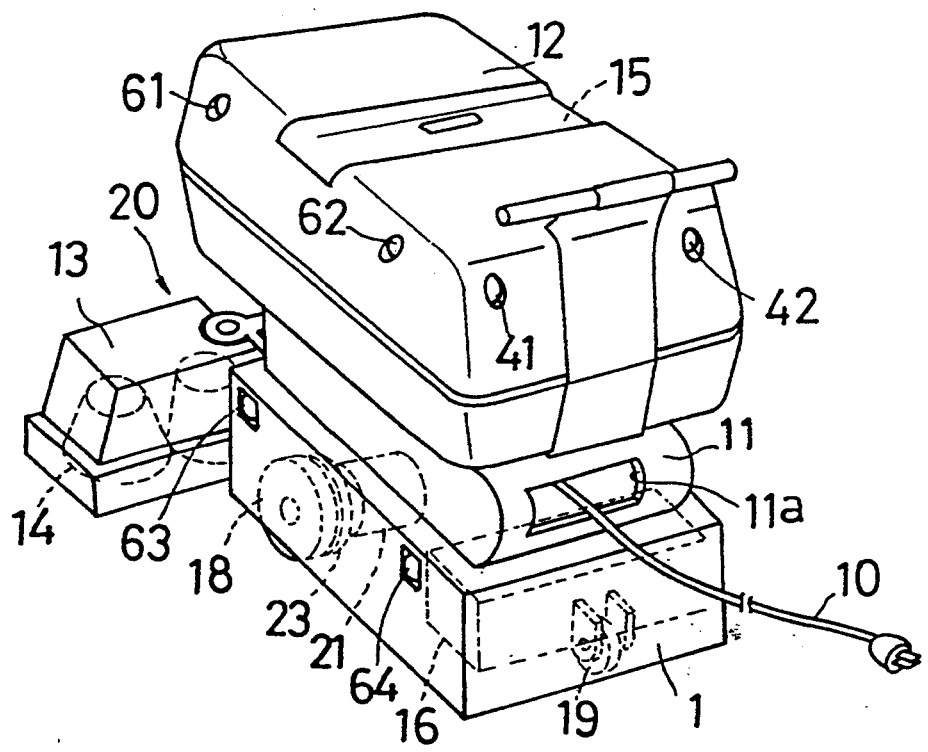
FIG. 3 is a perspective view showing the robot as it is seen from behind.

FIGS. 2 and 3 show a floor cleaning robot which has a pair of drive wheels 17, 18 at one end of a carriage 1 toward the direction of advance thereof (the right-hand side of FIG. 2) and an auxiliary wheel 19 in the form of a caster and positioned at the other end toward the direction of retraction. DC servomotors 2, 21 are connected to the drive wheels 17, 18, respectively. The drive wheels 17, 18 are provided, each on one side thereof, with measuring wheel encoders 22, 23 for measuring the distance of travel of the carriage 1.

The carriage 1 has a rotary housing 11 mounted thereon and rotatable in a horizontal plane, and a head housing 12 provided on the rotary housing 11. The rotary housing 11 has accommodated therein a mechanism (not shown) for winding up a power supply cord 10. Accommodated in the head housing 12 are a wash liquor tank 15 and electronic circuits (not shown) such as a power supply circuit and control circuit. A tank 16 for collecting washings is housed in the carriage 1.

The power supply cord 10 extending from the winding-up mechanism disposed within the rotary housing 11 is pulled out through a window 11a formed in the rear wall of the rotary housing 11 and is connected at its outer end to an AC power supply receptacle, whereby electric power is supplied to the cleaning robot.

The carriage 1 is provided in front thereof with a pair of opposite cleaner housings 13, 13 having an open bottom. Accommodated in each cleaner housing 13 is a cleaning mechanism 20 including two rotary brushes 14, 14 drivingly rotatable by a motor (not shown). The brush 14 has a lower end slightly projecting from the bottom of the cleaner housing 13.

The wash liquor tank 15 is held in communication with the interior of the cleaner housings 13, 13 by a rubber hose (not shown) to supply a wash liquor to the four rotary brushes 14 arranged in a row. A squeegee (not shown) disposed in the rear of the rotary brush 14 has a suction opening communicating with the washings collecting tank 16 through a flexible tube and a pump (neither shown).

During the travel of the carriage 1, the four rotary brushes 14 are drivingly rotated with the wash liquor supplied from the tank 15 to the brushes 14 at the same time, whereby a floor is cleaned. The resulting washings are aspirated into the squeegee with the advance of the self-propelled carriage 1 and collected in the tank 16.

The head housing 12 is provided with four long distance ultrasonic sensors 31, 32, 33, 34 directed forward, two long distance ultrasonic sensors 51, 52 and two like sensors 61, 62 directed toward opposite sides, respectively, and two long distance ultrasonic sensors 41, 42 directed rearward.

The cleaner housings 13, 13 are provided respectively with proximity ultrasonic sensors 35, 36 oriented forward.

Further the carriage 1 is provided with two proximity photosensors 53, 54 and two like photosensors oriented toward opposite sides, respectively.

Figure 4:
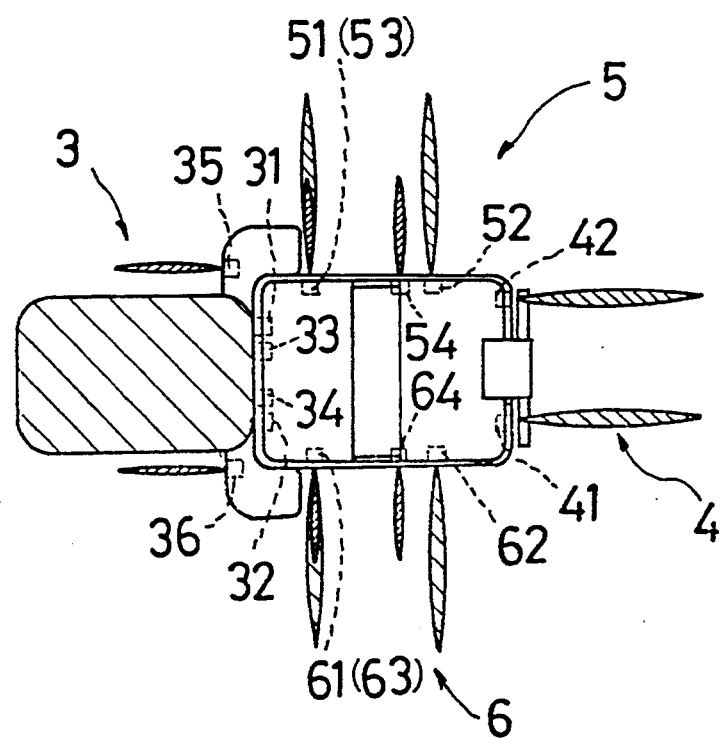
FIG. 4 is a plan view showing an arrangement of distance sensors and the measuring ranges thereof.
Figure 5:
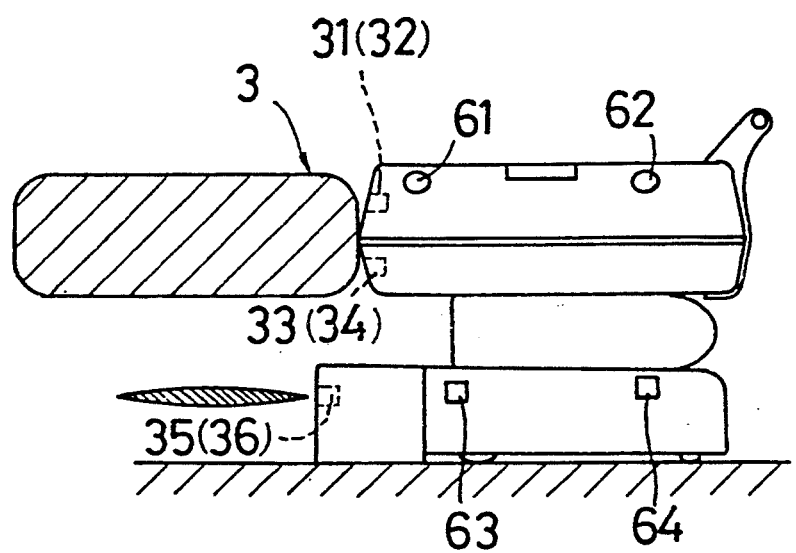
FIG. 5 is a side elevation showing the same.

As shown in FIGS. 4 and 5, the four long distance ultrasonic sensors 31, 32, 33, 34 and the two proximity ultrasonic sensors 35, 36 which are directed forward constitute a forward distance detector 3, and the two long distance ultrasonic sensors 41, 42 directed rearward constitute a rearward distance detector 4. A rightward distance detector 5 comprises the two long distance ultrasonic sensors 51, 52 and the two proximity photosensors 53, 54 which are directed toward the right with respect to the direction of advance. A leftward distance detector 6 comprises two long distance ultrasonic sensors 61, 62 and the two proximity photosensors 63, 64 which are oriented toward the left.

The measuring range of the long distance ultrasonic sensors is 300 mm to 9000 mm, that of the proximity ultrasonic sensors is 100 mm to 1000 mm, and that of the proximity photosensors is 100 mm to 500 mm.

Figure 6:
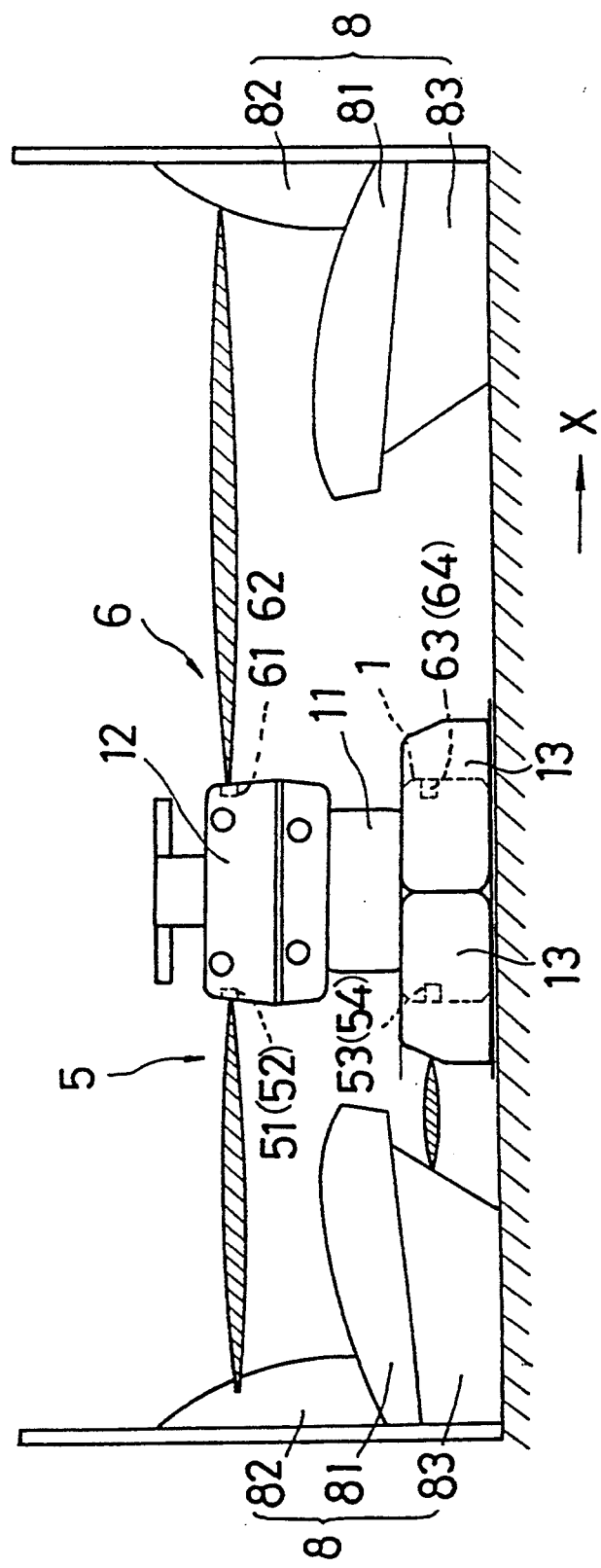
FIG. 6 is a front view of the same.

With reference to FIG. 6, the measuring target of the long distance ultrasonic sensors 51, 52 or 61, 62 arranged on the head housing 12 and included in the rightward distance detector 5 or the leftward distance detector 6 is the backrest 82 of the seat 8 when the seat 8 is present or the door or vehicle wall when no seat 8 is present. The measuring target of the proximity photosensors 53, 54, 63, 64 arranged on the carriage 1 is a metal plate providing a skirt 83 under the seating portion 81 of the seat 8 when the seat 8 is present or the door or vehicle wall when no seat 8 is present.

The output of the forward distance detector 3 or rearward distance detector 4 is used also for detecting an obstacle, other than the seat 8 or the vehicle wall, which is present ahead of or behind the robot (when the robot is advancing or retracting) to stop the robot in an emergency.

For example when the vehicle has a width of 2600 cm, any position of the robot with respect to a transverse direction (X-direction in FIG. 6) can be detected approximately accurately by the long distance ultrasonic sensors 51, 52 and 61, 62 on the opposite sides.

However, the proximity photosensors 53, 54 and 63, 64 are used for measurement since the long distance ultrasonic sensors are insufficient in the accuracy of measurement. In this case, there is a need to position the robot closer to one side of the vehicle as shown in FIG. 6 so as to position the proximity photosensors 53, 54 or 63, 64 on that side within the measuring range.

Figure 1:
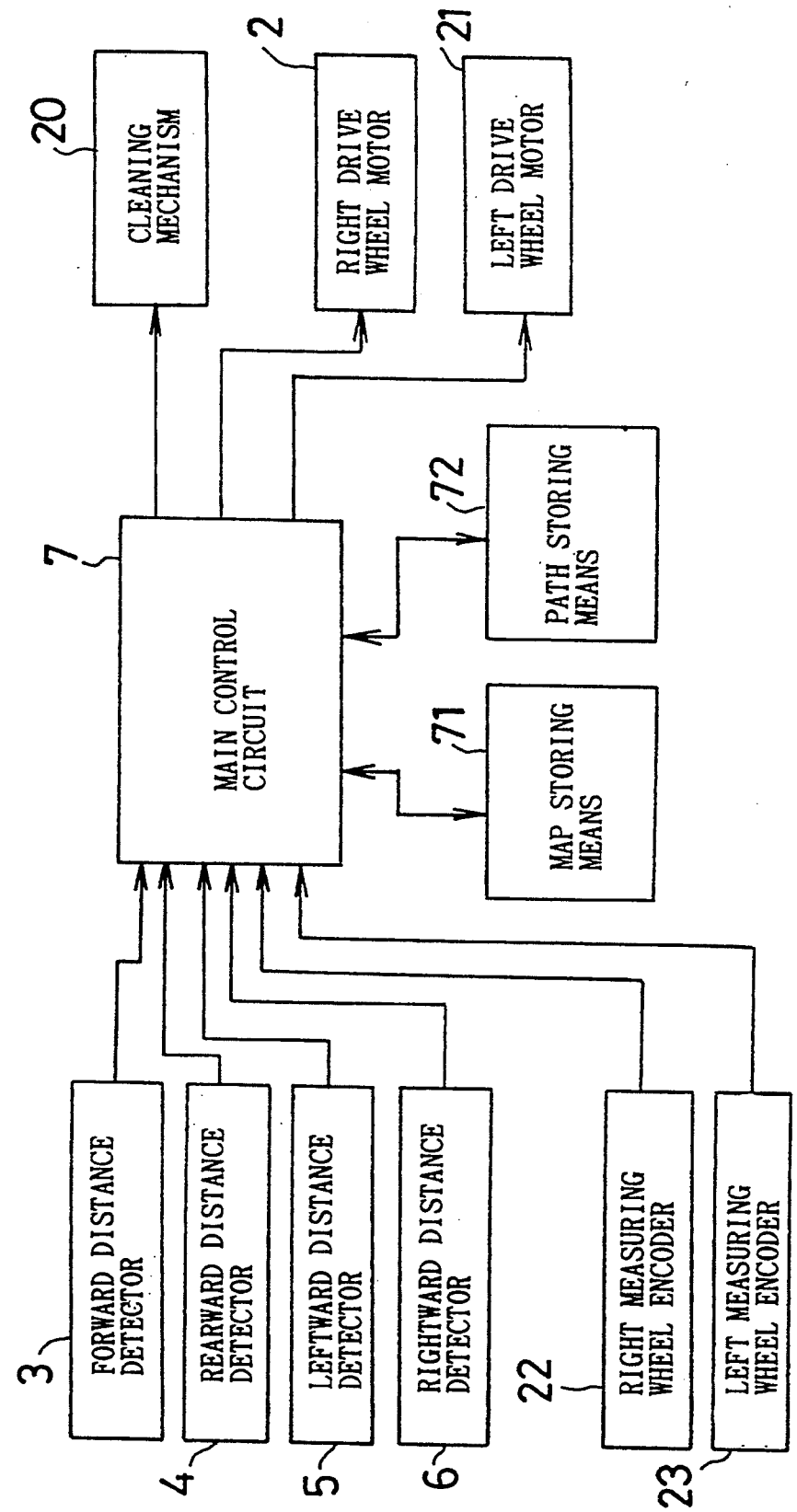
FIG. 1 is a block diagram showing a control system for a floor cleaning robot embodying the invention.

The floor cleaning robot has a control system shown in FIG. 1. A main control circuit 7 comprising a microcomputer has connected to input ports thereof the forward distance detector 3, rearward distance detector 4, rightward distance detector 5 and leftward distance detector 6, and also the right measuring wheel encoder 22 and the left measuring wheel encoder 23.

The output values of the two encoders are preserved as data as to the course actually traveled by the robot.

The main control circuit 7 has connected to input ports thereof map storing means 71 which has stored therein the configuration of the floor of the vehicle inside thereof and the positions of the seats therein and of the doors in the form of a two-dimensional map, and path storing means 72 which has stored therein a predetermined path of travel for cleaning the vehicle floor as expressed in X-Y coordinates on the map.

On the other hand, the main control circuit 7 has connected to output ports thereof the cleaning mechanism 20, right drive wheel motor 2 and left drive wheel motor 21 to control the start and cessation of cleaning operation and rotate the two drive wheels forward or reversely for the travel control of the carriage 1.

Figure 7:
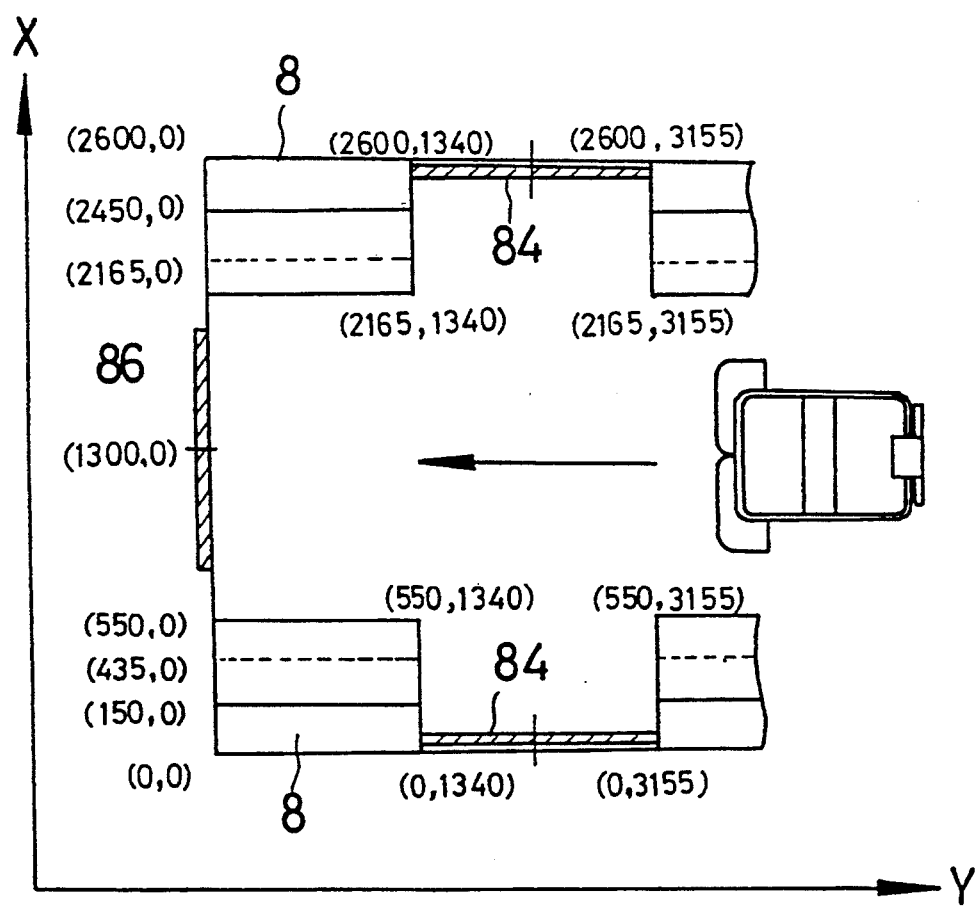
FIG. 7 is a diagram for illustrating a map stored in the robot.

As shown in FIG. 7, the map storing means 71 employs an X-Y coordinate system wherein an end portion of the vehicle is taken as the origin (0,0) for representing the positions of the four corners of each seat 8 and the center point of the gangway door 86 with respect to the transverse direction of the vehicle. The map is prepared only for the passenger car shown in FIG. 10, (c), and a map for the motor car shown in FIG. 10, (a) and (b) is prepared by cutting off the portion of driver's cab 85 from the map.

Further the path storing means 72 has stored therein the aforementioned path of travel for a cleaning operation from the start to completion, as expressed by the above coordinate system.

Figure 10A:
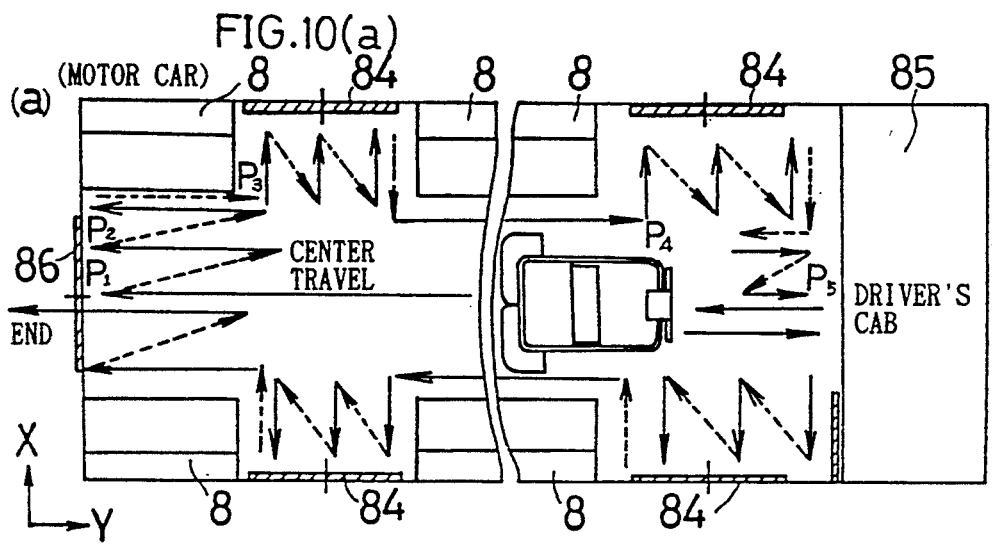
FIG. 10 includes plan views showing paths of travel in different types of vehicles with the robots in different initial positions.
Figure 10B:
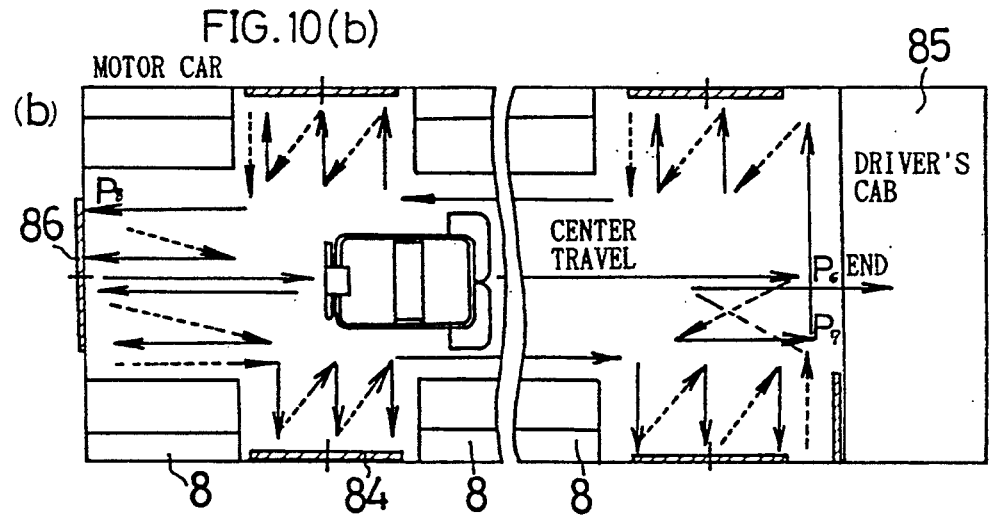
Figure 10C:
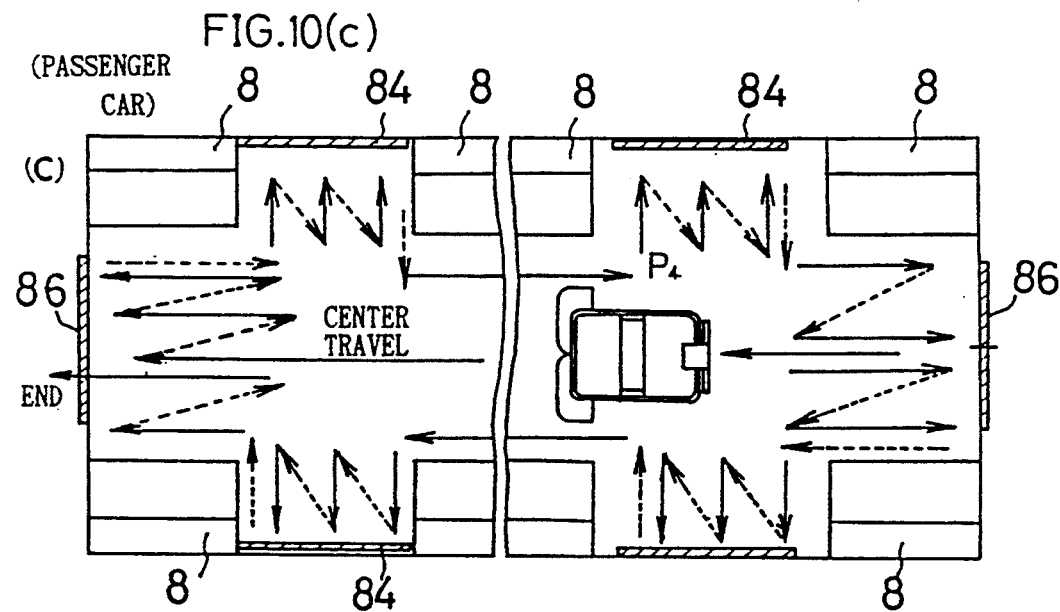

FIGS. 8 and 9 show the control steps to be executed by the main control circuit 7 to realize the paths of travel indicated by arrows in FIG. 10, (a), (b) and (c). In FIG. 10, the solid-line arrow represents a forward travel of the robot, and the broken-line arrow, a reverse travel thereof.

When the cleaning robot is placed, for example, in the motor car shown in FIG. 10, (a) and having the driver's cab 85, as oriented toward the gangway door 86 opposite to the cab 85, the robot first travels the center of the vehicle to an end portion thereof (steps S1 and S2 in FIG. 8). During this travel, the course of the robot is corrected based on the distance measurements obtained by the right and left long distance ultrasonic sensors, and the robot eventually moves to a position P1 facing the central portion of the gangway door 86.

Subsequently, the robot moves sideways toward one of the seats 8 to a position P2 at which the proximity photosensors on the corresponding side are in the measuring range so as to accurately recognize the position of the robot on the map based on the outputs from the proximity photosensors (step S3 in FIG. 8).

At the position P2, the distance to the seat 8 and the wall in the vicinity of the robot is measured from the outputs of the forward long distance ultrasonic sensors and the sidewise proximity photosensors (step S4 of FIG. 8).

Based on the measurements of the sidewise proximity photosensors, a judgment is then made as to whether the seat 8 is present (step S5 in FIG. 8). If the seat 8 is absent, the distance to the vehicle wall is measured at this time, whereby the absence of the seat 8 can be detected.

The current position of the robot is then recognized as coordinates on the map based on the distance data obtained in step S4 (step S6 of FIG. 8) to ensure a match between the actual position of the robot and the position thereof on the map (locking of the map, step S7 of FIG. 8).

The robot subsequently travels along the seat and one door (step S8 in FIG. 8) to clean the floor in the vicinity of the seat and the door. When the robot moves reversely from the position P2 toward the driver's cab 85 along the seat 8 at this time, the course is corrected with respect to the X-coordinate based on the measurements of the sidewise proximity photosensors. At a position P3 where the measurements greatly increase upon moving past the seat 8, the Y-coordinate is recognized again.

While facing the door 84, the robot thereafter repeatedly moves forward and reversely as indicated by arrows to clean the floor in the vicinity of the door. The robot further advances toward the driver's cab 85 along another seat 8 to thereby clean the floor in the vicinity of the seat.

An inquiry is made (in step S9 of FIG. 8) as to whether the robot has reached the last door 84 on the map. If the answer is in the affirmative, the robot as located at a position P4 checks whether the distance to the wall at the right is greater than a predetermined value based on the measurements obtained by long distance ultrasonic sensors (step S10 of FIG. 8). In this case, the driver's cab 85 is present at the right, so that the distance to the wall of the driver's cab 85 is measured. Since the measurement is smaller than that obtained in the case of a passenger car (FIG. 10, (c)), this indicates for the first time that the vehicle concerned is a motor car.

After the vehicle has been determined to be a motor car, the portion of the original map corresponding to the driver's cab 85 is cut off (step S11 of FIG. 8) to prepare a map for the motor car. With reference to this map, the robot then travels along the door (step S12 of FIG. 8) to reach a center position P5 facing the wall of the driver's cab 85.

At this position P5, a judgment is made as to whether the initial center travel left the central floor area locally uncleaned, based on the actual distance traveled by the robot and obtained from the encoder outputs (step S19 of FIG. 9). In the case where the robot is initially placed approximately at the center of the vehicle as seen in FIG. 10, (a), an uncleaned area remains on one side of the initial position toward the driver's cab 85, so that the robot travels from the position P5 to the initial position centrally of the vehicle to clean the remaining central area.

The robot thus returning to the initial position thereafter compares the distance to the front end of the vehicle with the distance to the rear end thereof, and moves to the end portion which is closer (step S22 of FIG. 9). In the case of FIG. 10, (a), the distance to the driver's cab 85 is shorter, and the robot therefore moves to the position P5.

The robot thereafter travels on the other side of the vehicle (i.e., right side of a viewer facing the driver's cab 85) along the doors and seats as in the foregoing procedure (step S23 of FIG. 9) and eventually moves to a position facing the gangway door 86 while checking the current position on the map (step S24 of FIG. 9) to complete the cleaning operation.

In the case where the cleaning robot is initially positioned as oriented toward the driver's cab 85 as shown in FIG. 10, (b), the robot travels the center of the vehicle to a position P6 facing the cab 85 and further travels sideways to a position P7 (steps S1 to S3 of FIG. 8).

The distance to the wall around the robot is thereafter measured at the position P7 (step S4 of FIG. 8) to judge the presence or absence of seat (step S5 of FIG. 8).

In the case of FIG. 10, (b), no seat is present on either side of the vehicle. This indicates that the vehicle concerned is a motor car. Accordingly, the portion of the original map corresponding to the driver's cab 85 is cut off (step S14 of FIG. 9) to prepare a new map.

The current position of the robot is then recognized as coordinates on the map based on the distance data obtained in step S4 (step S15 of FIG. 9) to ensure a match between the actual position of the robot and the position thereof on the map (locking of the map, step S18 of FIG. 9).

The robot subsequently travels along the seats and doors (step S17 of FIG. 9) to clean the floor in the vicinity of the seats and doors.

An inquiry is thereafter made (in step S18 of FIG. 9) as to whether the robot has traveled to an end position P8 of the vehicle. If the answer is affirmative, steps S19 to S24 thereafter follow to clean the remaining area.

In the case of the passenger car shown in FIG. 10, (c), on the other hand, the forward long distance ultrasonic sensors measure the distance to the gangway door 86 at the right at the position P4 of FIG. 10, (a) for identifying the type of vehicle, and the measurement obtained is greater than in the case of FIG. 10, (a). This indicates for the first time that the vehicle concerned is a passenger car (step S10 of FIG. 8).

The robot then travels along the door and seat with reference to the original map (step S13 of FIG. 8) without processing the map to clean the floor on one side of the vehicle, followed by steps S19 to S24 of FIG. 9 to clean the other side of the floor.

When the floor cleaning robot has stored therein one map for the passenger vehicle, a map for the motor vehicle is automatically produced upon identifying the motor vehicle as distinguished from the passenger vehicle, so that the map storing means can be smaller in memory capacity.

Further because the path of travel of the robot is predetermined and because the travel of the robot is controlled merely by correcting its course based on sensor outputs, the direction of travel can be changed without requiring time.

Consequently, the robot travels along the predetermined path accurately and efficiently while avoiding collisions with obstacles to clean the vehicle floor within a short period of time without leaving no corner uncleaned.

The above embodiment has been described to illustrate the present invention and should not be construed as limiting the present invention defined in the appended claims or reducing the scope thereof. Further the device and method of the invention are not limited to the foregoing embodiment but can of course be modified variously by one skilled in the art without departing from the spirit of the invention as defined in the claims.

What is claimed is:

1. A robot for cleaning a floor of a railroad vehicle while automatically traveling over the floor, the vehicle having seats and entrance-exit doors along both side walls of the vehicle, the robot having a robot body equipped with a cleaning mechanism and comprising:
   a travel mechanism controllable for locomotion in a desired direction,
   distance detecting means arranged as directed at least toward the front and opposite sides of the robot body for measuring the distance to an obstacle or a wall,
   map storing means having stored therein a cleaning region of the floor previously as a two-dimensional map,
   path storing means having stored therein a predetermined path of travel for cleaning the floor as expressed in coordinates on the map,
   first control means for recognizing the coordinates of the position of the robot body on the map based on outputs from the distance detecting means when the robot body is placed at an end portion of the floor, and
   second control means for correcting the course of the robot body based on outputs from the distance detecting means while the robot body travels from the coordinate position recognized by the first control means along the predetermined path.

2. A floor cleaning robot as defined in claim 1 wherein the robot is to clean a floor of a railroad vehicle while automatically travelling over the floor, the seats of the vehicle being elongated in the direction of advance of the vehicle and entrance-exit doors, the seats and the doors being arranged alternately along both side walls of the vehicle.

3. A floor cleaning robot as defined in claim 2 wherein the robot body further comprises:
   means for distinguishing between two types of vehicles based on outputs from the distance detecting means, the two types of vehicles being a motor vehicle having a driver's cab at one end thereof and a passenger vehicle having no driver's cab, and
   means for correcting the map in the map storing means according to the type of vehicles based on the result of distinction.

4. A robot as defined in claim 1 wherein map storing means stores therein a plurality of predetermined maps respectively representing cleaning regions of floors of different types of room in a form representing a two-dimensional map.

5. A method of controlling a robot for cleaning a floor of a railroad vehicle wile automatically traveling over the floor, the vehicle having seats and entrance-exit doors along both side walls of the vehicle, the robot having a robot body and comprising a travel mechanism controllable for locomotion in a desired direction, distance detecting means arranged as directed at least toward the front and opposite sides of the robot body for measuring the distance to the seat or the wall, map storing means having stored therein a cleaning region of the floor as a two-dimensional map, and path storing means having stored therein a predetermined path of travel for cleaning the floor as expressed in coordinates on the two-dimensional map, the method comprising:
   the first step of causing the robot body as placed in the interior of the vehicle to travel to an end portion of the vehicle along the direction of advance of the vehicle,
   the second step of recognizing at the vehicle end portion the coordinates of the position of the robot body on the map based on outputs from the distance detecting means, the third step of setting the recognized coordinate position as a reference point of automatic travel of the robot body on the map, and the fourth step of correcting the course of the robot body automatically traveling along the predetermined path based on outputs from the distance detecting means so that the robot body travels the predetermined path.

6. A controlling method as defined in claim 5 wherein in the fourth step, the robot body detects the current position thereof at a suitable time from outputs delivered from the distance detecting means to thereby check whether the robot body is actually traveling the predetermined path and corrects the course thereof only when deviating from the path.

7. A controlling method as defined in claim 5 wherein map storing means stores therein a plurality of predetermined maps respectively representing cleaning regions of floors of different types of room in a form representing a two-dimensional map.

8. A controlling method as defined in claim 5, wherein the robot is to clean a floor of a railroad vehicle while automatically travelling over the floor, the seats of the vehicle being elongated in the direction of advance of the vehicle and entrance-exit doors, the seats and the doors being arranged alternately along both side walls of the vehicle.

9. A controlling method as defined in claim 7 wherein in the fourth step, the robot body further distinguishes between two types of vehicles one of which is a motor vehicle having a driver's cab at one end thereof and the other of which is a passenger vehicle having no driver's cab, based on outputs from the distance detecting means, and corrects the map in the map storing means according to the type of vehicles based on the result of distinction.

* * * * *